RAPID ACCESS RECORDING SYSTEM

Filed Aug. 21, 1963

INVENTORS.
WILLIAM F. BARTLETT
BARRIE BRIGHTMAN
BY
George W. Killian
AGENT

RAPID ACCESS RECORDING SYSTEM

Filed Aug. 21, 1963 2 Sheets-Sheet 2

United States Patent Office 3,334,338
Patented Aug. 1, 1967

3,334,338

RAPID ACCESS RECORDING SYSTEM

William F. Bartlett, Rochester, and Barrie Brightman, Webster, N.Y., assignors to General Dynamics Corporation, Rochester, N.Y., a corporation of Delaware Filed Aug. 21, 1963, Ser. No. 303,518
17 Claims. (Cl. 340—174.1)

ABSTRACT OF THE DISCLOSURE

Apparatus employing time division mutiplex techniques for recording and reading out information bits representative of a plurality of messages from a plurality of magnetic tracks of a movable magnetic drum, with each track being comprised of a plurality of time frames having a plurality of time slots and having an effective starting position which does not coincide with that of any other track.

Figure 1:
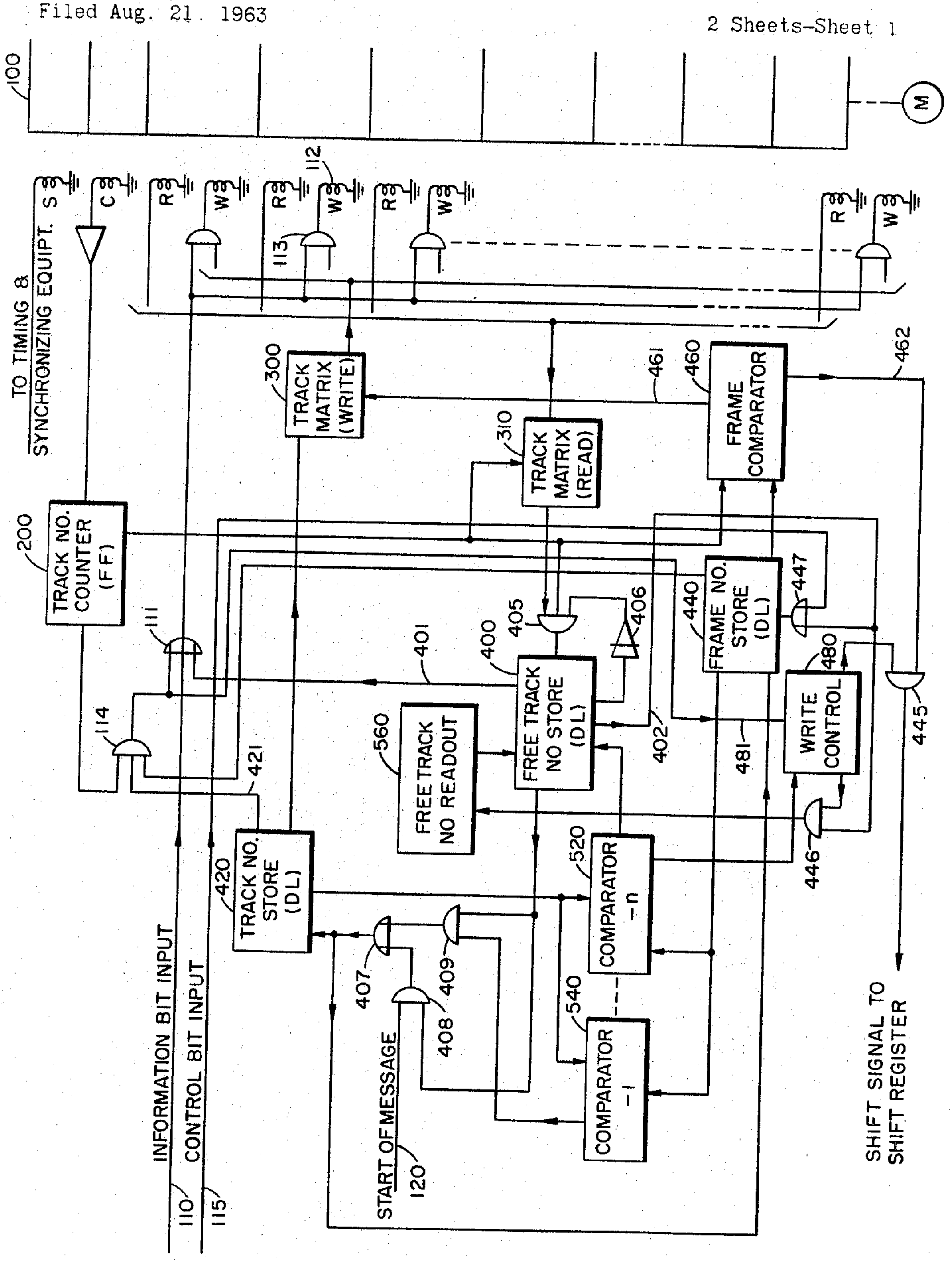

This invention relates in general to recording means for use in a data processing system and, more particularly, to a means for the more efficient and rapid recording of data processing messages of variable length.

In the data processing field, it is frequently necessary to temporarily record a message for later use, or for later transmission to one or more addresses. In such systems, it is well known to employ a magnetic drum for the temporary registration of such messages which may comprise a series of words and/or digits and/or other symbols and characters. In a system wherein the message to be recorded may be either a relatively short message, or a relatively long message, complicated problems relating to efficient use of the available recording medium arose. Either a given track on the drum had to be of sufficient capacity to record the longest possible message, or provision had to be made to continue a message from one track to another. If the first solution was used, then, because few messages would approach the maximum length, it would not be practical to make very efficient use of the drum surface as most of the surface of most tracks would be blank because only one message would be recorded in a track. In the second case, where a message is continued form track to track, it is necessary to find an idle track when the first track is filled. Since tracks have conventionally started from a given fiducial point, either several rotations or the drum may be required to locate a free track as the tracks are sequentially interrogated, or plural interrogating equipment must be provided to interrogate a plurality of tracks simultaneously. To overcome these difficulties, it is highly desirable to provide a system which interrogates the available tracks and locates an idle track in a minimum time. While the interrogating equipment is searching for an idle track, the bits of information forming the message must be temporarily recorded in a buffer store. The faster an idle track can be found, the smaller and more economical the buffer store can be.

Accordingly, it is the general object of this invention to provide a new and improved recording means for data processing.

It is a more particular object of this invention to provide a new and improved means for recording messages of variable length on a recording medium in a more efficient manner.

It is another object of this invention to provide a new and improved means for recording messages of variable length on a recording medium in a manner that makes more efficient use of the recording medium.

It is another object of this invention to provide a new and improved means for selecting an idle track on a recording medium.

It is another object of this invention to provide new, improved, and more efficient means for continuing a message from one track to another.

It is another object of this invention to provide new and improved means for interrogating a plurality of tracks on a rotatable recording medium in order to locate a track which is available for registering a message, all with a minimum rotation of the medium.

It is another object of this invention to provide new and improved means for preselecting the track which is to be used in recording the next message to be recorded.

It is another object of this invention to provide new and improved means for registering a plurality of messages in a given track on a time division multiplex basis.

It is another object of this invention to provide new and improved means for recording a plurality of messages on the recording medium within the same interval of time by using time division multiplex techniques.

It is another object of this invention to provide new and improved means for permitting the resumption of the recording of an interrupted message.

In accordance with one embodiment of the present invention, the recording medium may comprise a conventional magnetic drum which is divided into a plurality of tracks. Transducing means are provided for reading information into or out of each track and a motor is provided to rotate the drum relative to the transducing means. Each track may be thought of as divided into a plurality of frames, and each frame may be thought of as divided into a plurality of time slots. For convenience, it will be assumed throughout the following description that each frame is divided into twelve time slots. Obviously, any other number of time slots per frame may be used. The signals representing messages to be recorded will be applied to the transducing means on a time division multiplex basis, and will be written onto the drum surface in such a manner that the elements forming a given message will be recorded in a given time slot of each of the successive frames of a given track. For example, twelve messages may be multiplexed together and registered on the magnetic surface of the rotating drum during the same time interval. The first element of the first message, which is presumed to be in the first time slot, may be recorded on the first time slot of the first frame of the first track. The first element of the second message, which is presumed to be in the second time slot, may be recorded in the second time slot of the first frame of any available track, which may happen to be the first track or any other track. In a similar manner, the first element of each of the successive messages are recorded in appropriate available time slots and tracks. Finally, the second element of the first message will be recorded in the first time slot of the second frame of the first track and so on until each message is completely recorded, or until the end of one of the tracks is reached. Because the bits forming the different messages may be derived from sources which provide bits at various speeds, the recording of the messages may get out of phase. In general, the speed of rotation of the recording medium must be such that it advances one frame in no more time than the time interval between bits in the message which is transmitted at the fastest rate.

As soon as the recording of a message is started, a preselector is caused to determine the identity of the track in which the message may be continued, if required. The preselecting and registration of the available track must occur in less than the time it takes to fill the track in use. That is, the locating of the available track should be completed in not over one revolution of the magnetic drum. A message which is being continued from one track to another will be recorded in the same time slot of the second track that was used in the first track. That is, although a message may continue from track to track, it is always recorded in the same time slot.

In order to implement message recording, rapid interrogation, and preselection, a novel layout of the track frames and time slots on the recording medium is provided. In the system incorporating the present invention, the effective beginning of each successive track starts in the frame succeeding the effective beginning of the preceding track. For example, track one may be assumed to begin in frame one, track two in frame two, track *n* in frame *n*, etc. Accordingly, by recording in the time slots of the first effective frame of each track an indication of the busy or idle condition of the respective time slots in that track, it is possible to sequentially interrogate the availability of each of the time slots in each of the tracks within one revolution of the drum provided only that each track has more frames than the total number of tracks. A track number counter is provided to count the number of frames from the first frame of the first track and, therefore, the setting, or count, of the track number counter is also equal to the number of the track whose first frame is available for interrogation. The track number counter resets each revolution of the drum. A free track number store is used to register the identity of the next track allotted for use with each of the time slots. For example, the free track number store may have registered in its dynamic store the information that time slot one is free in track three, that time slot two is free in track one, that time slot three is free in track seven, that time slots four and five are free in track five, that time slots six and seven are free in tracks two and six, respectively, etc. Thus, the free track number store always has registered therein the identity of the track in which messages in any of the time slots may be registered. During interrogation, the track number is transferred to the free track number store from the track number counter the first time a track is encountered having the desired free time slot. The entry of other track numbers having the same free time slots is blocked until the registered track has been used and then a reinterrogation starts and a new track number is registered in the free track number store. When a message is too long to be contained in the assigned time slot of one track, the identity of the track number with the same time slot available is recorded in the last few time slots of the track being filled and the message is then continued in the track whose identity was recorded in the free track number store. By this means, the readout equipment is advised where to look for the continuation of the message. The recording of the message must be interrupted and stored in a buffer until the drum has rotated to the appropriate position so that the first frame of the new track is under the transducing heads.

A track number store is provided and its function is to store the identity of each track number currently in use with each of the twelve time slots. The information is read into the track number store from the free track number store when a new track is taken for use. The track number store provides partial control to a track matrix so that input signals are directed to the appropriate transducer heads and written onto the drum in the proper track and time slot. When a message is being recorded in time slot two of track three, the interrogating equipment will sequentially interrogate time slot two of each of the successive tracks until one is found with time slot two free. If it is assumed that track six is the first track found to have time slot two free, then the identity of track six is registered in the free track number store. Subsequently, when track three is filled, the identity of track six will be transferred to the track number store and, therefore, bits of information in time slot two will then be steered to time slot two in track six by the track matrix. However, it is quite probable that the drum must be allowed to rotate one or more frames before the first frame of track six is under the transducing head for track six. Therefore, when the last available frame of track two is used, the succeeding bits of the message must be held in a buffer store until the first frame of track six is in the appropriate position. Since the position of the first frame of each track is in a predetermined position relative to the first frame of track one, the track number counter can be used to provide an indication of when the first frame of a given track is in the appropriate position relative to the transducing heads for that track.

The frame number store and the frame comparator function together to guide each successive bit of a given message into the proper frame of the required track. More specifically, the recording of a message may be interrupted for any of various reasons and, of course, when the recording is resumed, it is necessary that it be resumed in the proper slot frame and track. The frame number store has recorded therein a memory of the time slot and frame number to which the next bit of the message in that time slot must be stored, and the track number store has recorded therein a memory of the track number. Recognition of when the appropriate position on the drum is under the proper recording head is provided by the track number counter. When the information registered in the frame number store is the same as that in the track number counter, the frame comparator recognizes the identity and provides an output signal which enables the track matrix so that the bit can be written onto the drum. At the same time, the frame number store is advanced one step so that the next bit will be routed to the same time slot in the next frame.

Further objects and advantages of the invention will become apparent as the following detailed description proceeds, and features of novelty which characterize the invention will be pointed out in particularity in the claims annexed to and forming a part of this specification.

Figure 2:
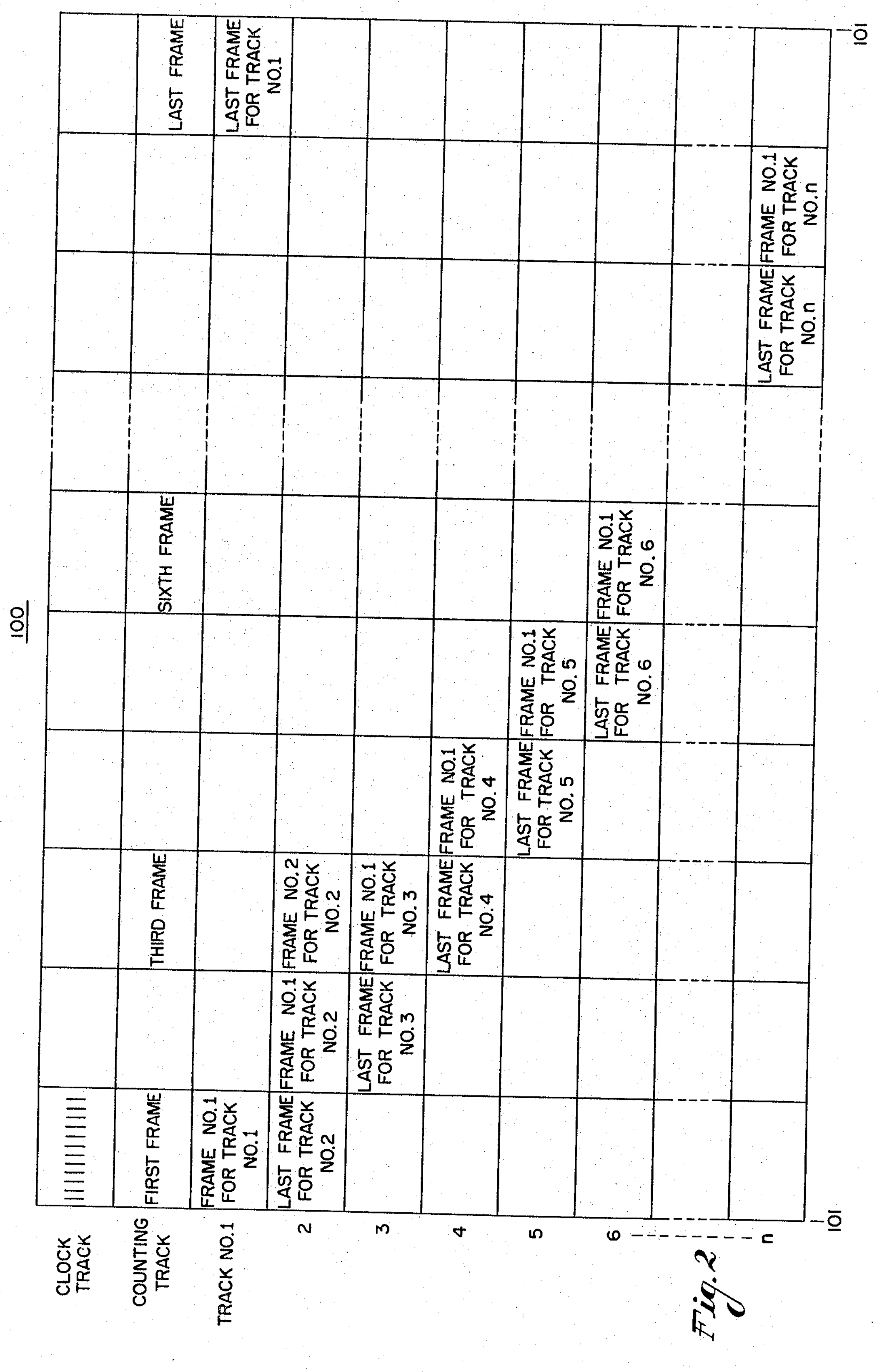

For a better understanding of the invention, reference may be had to the accompanying drawings in which:

FIG. 1 illustrates a logic schematic of a system incorporating the present invention; and FIG. 2 illustrates the manner in which the drum surface is divided into a plurality of tracks and frames.

It is believed that the operation of the system incorporating the present invention can best be understood by first summarizing the principal function of each of the components illustrated in the logic diagram of FIG. 1.

A recording medium 100 is divided into a plurality of tracks, each of which is subdivided into a plurality of frames comprising a plurality of slots. Associated with each main track is a pair of read and write transducing means designated R and W, respectively. The layout of the heads and recording medium is such that no two tracks have their effective beginning under their respective heads at the same time.

Transducing head C, associated with the second track from the top, detects a recording in each frame, and transducing head S, associated with the top track, detects a recording in each slot of each frame for timing and synchronizing purposes.

Track number counter 200 responds to the signals from head C and, therefore, always has registered therein a number corresponding to the number of frames the recording medium has advanced past an arbitrary beginning. The track number counter 200 is reset by means (not shown) each time the recording medium returns to its arbitrary beginning. Each main track is designated by a number corresponding to the number of frames between the effective beginning of the track and the arbitrary beginning of the recording medium. Accordingly, the setting of the track number counter 200 corresponds to the identity of the track then having its first frame under its read-write heads.

The track matrix (write) 300 provides an enabling signal for the various write heads. The signals from the track number store 420 and the frame comparator 460 determine the specific one of the write heads that is enabled by the track matrix (write) 300 at any particular instant.

The track matrix (read) 310 receives as one input signals from each of the read heads and as another input the number registered in the track number counter 200. Accordingly, the track matrix (read) 310 produces an output pulse indicative of the recording in the track which has its effective beginning in the frame which is a number of frames from the arbitrary beginning of the medium corresponding to the setting of the track number counter 200. The output pulse will be indicative of the busy or idle condition of the track.

The free track number store 400 will have recorded therein the identity of the next track that is available for use. The track number counter 200 will enable the track matrix (read) 310 to pass an idle signal only from a head which is over the first frame of its track. When such an idle signal is detected, the AND gate 405 is enabled to pass the number in the track number counter 200 to the free track number store 400 if the inverter 406 applies an enabling potential to gate 405. The inverter 406 will apply an enabling potential to gate 405 at all times except during the time slots wherein a free track number is already stored in the free track number store 400.

The track number store 420 stores the identity of the track number currently in use with a particular time slot and, as already stated, provides a partial enabling to the track matrix (write) 300 to guide input information to the desired track.

Gates 407, 408 and 409 control the transfer of the identity of a free track number stored in the free track number store 400 to the track number store 420.

The frame number store 440 memorizes the frame number to which the next bit of information in a given time slot must be steered.

The frame comparator 460 compares the setting of the frame number store 440 and the track number counter 200 and, when they are identical, provides a signal to the track matrix (write) 300 to enable the AND gate associated with the desired write head to guide the input to the proper frame.

The comparator —*n* 520 compares the settings of the track number store 420 and the frame number store 440 and, when the track is *n* frames from being filled, the comparator —*n* 520 provides an output signal that prevents further input information from being recorded on that track. The last *n* frames are reserved for recording the identity of the track on which the message is to be continued.

The free track number readout 560 causes the identity of the free track number registered in the free track number store 400 to be transferred bit by bit over lead 401 to the last *n* frames of the track currently in use.

The comparator —1 540 compares the settings of the track number store 420 and the frame number store 440 and, when the track is one frame from the end, this circuit provides an output signal that causes the identity of the free track registered in the free track number store 400 to be transferred to the track number store 420.

The write control circuit 480 accepts an output signal from the comparator —*n* 520 when the track is *n* frames from the end and, in response thereto, provides an inhibiting potential to AND gate 445 to prevent the frame comparator from sending a shift signal to the shift register. At the same time, the write control circuit 480 provides an enabling potential to AND gate 446 to admit control pulses to the free number store 400. When a busy mark is passed through AND gate 114 to the first frame of the new track, a signal is passed to the write control circuit 480 over lead 481 to cause the write control circuit to enable and inhibit AND gates 445 and 446, respectively.

Inasmuch as the details of the individual circuits for performing the foregoing functions do not form a part of this invention, and since one skilled in the art to which this invention appertains could readily produce circuits having the required characteristics, the details of the circuits are not shown as it is believed they would only tend to mask or obscure the inventive concept disclosed herein. In addition, for convenience, AND gates, OR gates, amplifiers, and inverters are illustrated in logic diagram form.

AND gates are represented in the drawings by a symbol which has the general shape of a D. The inputs to an AND gate are drawn to the straight line part of the D while the output is drawn from the arcuate portion of the D. All the AND gates illustrated in the drawings are of the type that will provide a negative output potential only when all the inputs are negative. When any one or more of the inputs to an AND gate are positive, the output potential will rise to a more positive potential.

OR gates are similar in appearance to AND gates but are distinguished therefrom by having the input leads extend beyond the straight line portion of the D and to the arcuate portion. All the OR gates illustrated in the drawings are of the type that will provide a negative output potential when one or more of the inputs are negative. When all of the inputs to an OR gate are positive, the output potential will rise to a more positive potential.

Amplifiers are represented by an isosceles triangle with the input at the base and the output at the apex. The amplifiers used in the illustrated embodiment of the invention provide a ground or positive output signal at all times except when a negative input signal is applied to the input of the amplifier.

Inverters are similar in appearance to the amplifiers but have an additional line which is equal in length to the base of the triangle and is drawn parallel to the base and bisected by an imaginary altitude of the triangle. The inverter used in the illustrated embodiment of the invention provides a negative output signal at all times except when a negative input signal is applied to the input of the inverter. Accordingly, the application of a negative input signal to the input of the inverter causes the inverter to produce an inhibiting or ground output signal.

FIG. 2 provides a planar representation of the surface of the recording medium from a magnetic drum. The surface could be re-formed into the cylindrical shape by joining together the two vertical lines designated 101. The drum surface is divided into a plurality of main tracks, such as tracks 1, 2, . . . *n*. Each main track is divided into a plurality of frames. For the purposes of this description, it will be assumed that the transducing heads for writing information onto and reading information from the drum surface are all arranged in a straight line; although this would not normally be the practice. Line 101 may represent an arbitrary beginning of the drum surface. In addition to the main tracks, the drum surface includes a counting track and a clock track, both of which are divided into individual frames, as are the main tracks. The counting track has permanently recorded therein one recording per frame, while the clock track has permanently recorded therein one recording per slot. In addition, the counting track has a unique recording to indicate the arbitrary beginning thereof. The transducing means C, associated with the counting track, will detect the recordings therein and pass signals to the track number counter 200 which will advance one count per frame and reset at the arbitrary beginning of the counting track. The clock track provides timing and synchronizing signals for the entire system. As may be seen from FIG. 2, track 1 has its first frame corresponding with the first frame of the counting track; tracks 2 and 3 have their first frame corresponding with the second and third frames, respectively, of the counting track; and track *n* has its first frame corresponding with the *n*th frame of the counting track. Therefore, if the track number counter 200 is set to a count of one each time the first frame of the counting track passes under its read head and advances one count each time the successive frames of the counting track pass under the head, then the setting of the track number counter 200 will always correspond to the number of the track that has its first frame under the transducing heads at that instant. It should be observed, for example, that when frame 1 of track 5 is under its transducing heads, that the track number counter 200 will have the digit "5" registered therein and that, at the same time, frames 5, 4, 3 and 2 of tracks 1, 2, 3 and 4 respectively, will be under their heads. And, at the same time, the last frame of track 6 will be under the heads for track 6.

FIG. 2 is not intended to indicate any particular relationship between the number of tracks and the number of frames. In general, this description assumes that each track has more frames than the total number of tracks. However, the invention disclosed herein is not limited to this arrangement.

The present invention is ideally suited for use in a system wherein it is desired to be able to receive messages at various bit rates from a plurality of sources and record these messages concurrently for subsequent use and/or readout or retransmission, and wherein the message lengths may vary so that some will contain fewer bits than the storage capacity of an individual track, while other messages may include more bits than the storage capacity of an individual track. In the latter case, it is necessary to continue the recording of the message from one track to another and to facilitate readout, the identity of the second track must be recorded in the last few frames of the first track.

For the purposes of explaining the present invention, it will be assumed that messages are received at various speeds from a plurality of sources, and that signals representative of the individual bits comprising the messages are entered into a time division multiplex shift register whose frame rate and time slots are synchronized with the timing pulses read from the clock track of the drum surface. The shift register will have sufficient capacity to store therein all the information received from the highest speed sources during the time that the drum can make two revolutions. The information can be read out of the shift register much faster than the information is entered therein. Accordingly, once each time frame, a signal will appear on lead 110 from the shift register which is indicative of the bit of information for each of the twelve messages. Information indicative of the bits of a message will be recorded in a message portion of the shift register and each time a bit is recorded therein, either as a 1 or a 0, a 1 will be recorded in an equivalent slot and frame position of the control portion of the shift register. The bits will be recirculated in the shift register until they are read out one by one. Each time a bit is read out of the register, a pulse is applied to the shift register to inhibit the recirculation of the bit. Simultaneously, the shift register will apply a 1 pulse to the control bit input lead 115 if the bit read out was a portion of the message and not a random pulse. That is, if the message portion of the register has no more message bits, the control portion will not have a 1 registered in that frame and slot and, therefore, no 1 pulse will be applied to the control bit input lead 115. The application of the 1 pulse to the lead 115 will advance the frame number store 440 so that the next bit will be routed to the next frame. In this manner, bits are read from the shift register into successive frames of a given track until the shift register is empty, whereupon the recording on the drum surface will stop for at least one revolution of the drum while more information is fed from the message source into the shift register. Subsequently, the shift register is read out again and signals indicative of these bits will be registered in the group of frames following those previously used.

It is believed that the operation of the system can be most easily understood if only one message and one time slot are considered at a time. However, it must be understood that the system works with a plurality of messages and time slots and that the dynamic registers in the various circuits are all synchronized with each other and with the pulses read from the clock track.

In the following description it will be assumed that the message applied in time slot 8 of the repetitive time frame is to be considered. Furthermore, it will be assumed that the message is to be recorded in track 2 and, of course, in time slot 8 of track 2. Naturally, the time slot numbers always match, but there is no relationship between the time slots and the track number. In this case, by means which will be described more fully later, the track number store 420 will have registered therein, in time slot 8, the identity of track 2. The track number counter 200 employs a flip-flop counter and will be advanced step-by-step each time the transducing head C responds to a signal in the counting track which occurs once per track frame. The track number counter 200 is reset to an initial setting each time the drum passes an arbitrary position once per revolution. As previously mentioned, the arrangement is such that the track number counter 200 is always set to the setting which corresponds to the identity of the track which then has its first frame under its transducing heads.

By means which will be more fully explained below, it will be seen that, when the identity of track 2 is stored in time slot 8 of the track number store 420, number 3 is stored in frame number store 440; that is, the frame number store 440 has stored therein a number which is one greater than the track number. The frame number store 440 will advance one count as each bit of the message is stored in the eighth time slot of the successive frames of track 2. Thus, the frame number store 440 always has recorded therein the identity of the frame which is to be used to register the next bit of information in the track whose identity is registered in the track number store 420.

If it is assumed that a signal indicative of the first bit of the message is applied to bit input lead 110, it will be seen that the signal can pass through OR gate 111 and be applied to one input of the AND gates associated with each of the write heads. The signal applied to lead 110 may be either a positive or negative potential to indicate either a 1 or 0 bit, as may be required. To write the bit onto the drum in the right track and frame, it is necessary to enable AND gate 113 while frame 2 of track 2 is under head 112. Frame 1 of each track is reserved for the recording of a signal indicative of the busy or idle condition of that track. Reference to FIG. 2 will show that frame 2 of track 2 will be under its heads when the track number counter 200 has advanced to a count of three. Also, it will be recalled that 3 was recorded in frame number store 440. The frame comparator 460 monitors and compares the registration in the track number counter 200 and the frame number store 440 and, when the two are the same, an output pulse will be applied to lead 461 to provide a first input signal to the track matrix (write) 300. At the same time, track number store 420 will apply a second input signal to the track matrix (write) 300. The matrix is designed so that with these two inputs the AND gate to the write head of the second track is enabled. In a similar manner, a write head can be enabled in any frame position for any track. In the case under consideration, it must be recognized that the AND gate 113 is enabled only for the time of one time slot since the output of the track number store 420 is a time slot pulse. It must also be remembered that the multiplexed signals on lead 110 are synchronized with the drum so that, at the instant that track number store 420 provides the signal just mentioned, the signal on lead 110 is the one in the eighth time slot. Thus, it is possible to read a bit in any time slot from lead 110 and write it onto the drum surface in the corresponding time slot of a selected track and frame.

At the same time that the frame comparator provides an enabling pulse on lead 461, a pulse is applied to lead 462 which is passed through AND gate 445 to the shift register to inhibit the recirculation of the bit just read out. AND gate 445 is enabled in the eighth time slot by write control circuit 480.

If additional bits of information are registered in the shift register, the signal indicative of the next bit of information will be applied to lead 110 when the drum rotates one track frame and, therefore, the recording and advancing of the frame number store 440 will be repeated, as just described. If the pulse received from the shift register on lead 110 when the frame comparator 460 provided the pulses on leads 461 and 462 was a portion of the message and not a blank or empty slot, a 1 signal will be applied to the control bit input lead 115 which will pass through OR gate 447 to advance the frame number store 440 one count in order to cause the next bit to be enabled to be registered in the next track frame. In the event that the pulse received from the shift register on lead 110 was a pulse not indicative of a message bit, the frame number store 440 will not be advanced as just described, as a 1 pulse will not appear on lead 115. In this case, the random pulse from lead 110 will be written onto the drum in the same frame once each revolution until finally a message bit is received and the frame number store 440 advanced, as described above.

In this manner, the recording of the message will continue with successive bits recorded in successive frames of the assigned track with the drum making one or more revolutions between the recordings of message bits when the signals are not available from the shift register.

In general, the system should be so arranged that the signals can be recorded on the drum surface faster than the signals are received at the shift register from the highest speed source. If the system did not have this ability, it would be necessary to provide a shift register having a very large capacity.

Let it be assumed that the message being recorded will more than fill the eighth time slot of the second track. The system prepared for this possibility by looking for a track in which time slot 8 was free as soon as time slot 8 of track 2 was registered in the track number store 420. More specifically, as soon as the identity of track 2 was registered in the track number store 420, the inverter 406 was caused to apply an enabling potential to AND gate 405 in the eighth time slot. It will be recalled that the track number counter 200 is set to a setting equal to the number of the track which then has its first frame under the read-write heads. Therefore, at this time, the read-write head of the track whose first frame is thereunder will apply input signals to the track matrix (read) 310 in each time slot which is idle. If time slot 8 happens to be idle, the number that is registered in the track number counter 200 will be enabled to be transferred through gate 405 to the free track number store 400 and, of course, it will be recalled that this number is indicative of the track just interrogated. If time slot 8 is busy, the next read head will interrogate the next track, and so on, frame by frame, until a track is found in which time slot 8 is idle. It should be understood that the interrogation and registration of the identity of the free track occurs simultaneously with the registration of information in the first track assigned, which was assumed to be track 2. Accordingly, long before the assigned track is filled, another track with the same time slot available will have been found since it is possible to interrogate all tracks in one revolution of the drum. That is, since the tracks may be interrogated sequentially rather than one per drum revolution, it is possible to find an idle track in a very short time.

The shift register may be required to hold enough bits to equal approximately the number of bits that may be received from the highest speed source while the drum makes two revolutions without reading out any bits. This may occur in the following manner. Let it be assumed that the last message bit in the register is recorded in the second from the last available frame of the track in use. The drum will revolve once while the shift register receives bits from the source and, after one revolution, one bit will be recorded in the last frame of the track, thereby leaving essentially all the message bits in the register. If it is assumed that the first frame of the next track is one revolution of the drum from the last frame of the track just filled, then it will be seen that while the drum rotates to the first frame of the new track that the shift register will have to accept bits from the source while the drum rotates one revolution. Accordingly, the shift register will be required to have the capacity to register bits from the highest speed source for two drum revolutions without any readout.

It will now be assumed that track 4 was found to have time slot 8 idle and, of course, this will occur before track 2 is filled. The recording in track 2 will continue until the comparator $-n$ 520 detects that track 2 is $n$ frames from the end. That is, the comparator $-n$ 520 compares the setting of the frame number store 440 and the track number store 420 and, when the frame number store 440 has been advanced to a predetermined setting which is based upon the registration in the eighth time slot in the track number store 420, it will be an indication that only $n$ frames remain in the track and that, therefore, the recording of the message is to be stopped in order to permit the registration of the identity of the track on which the message will be continued. The comparator $-n$ 520 will send a time slot pulse to the write control circuit 480 and to the free track number store 400. In response to the signal from the comparator $-n$ 520, the write control circuit 480 will inhibit AND gate 445 in the eight time slot to prevent the transmission of a shift pulse from the frame comparator 460 to the shift register.

The free track number store 400 will respond to the pulse from the comparator $-n$ 520 by providing on lead 401 the first of the bits required to be registered in the last $n$ frames of the track in current use to identify the continuation track. The bits on lead 401 will be gated through OR gate 111 and routed to the drum in the same manner as bits from lead 110. Each time a bit is placed on lead 401, a control pulse is applied to lead 402 which advances the frame number store 440 just as a pulse on lead 115 did. In addition, the pulse on lead 402 is passed through enabled AND gate 446 to the free track number readout 560 which causes the free track number store 400 to apply the next bit to lead 401.

When the comparator $-1$ 540 compares the setting of the frame number store 440 and the track number store 420 and finds that track 2 is one frame from full, the identity of the new track number (4) will be enabled to be transferred through AND gate 409, which is enabled by the comparator $-1$ 540 and OR gate 407, to the track number store 420. At the same time that the identity of the new track is transfered to the track number store 420 through OR gate 407, a pulse is passed to the frame number store 440 to set it to the number corresponding to the first frame of the new track. With the frame number store 440 set to the frame number of the first frame of the new track, AND gate 114 will be enabled when the track number counter 200 is set to the same number and a pulse will be passed from the track number store 420 over lead 421 and through gates 114 and 111 to be written on the drum just as any bit from lead 110. In this manner, a mark is put in the first frame of the new track to mark the track as busy. The same pulse which passed through OR gate 111 is also applied to lead 481 to reset the write control circuit 480 which will enable and inhibit AND gates 445 and 446, respectively. Thereafter, additional bits will be admitted from lead 110 and recorded in successive frames of the new track.

When the end of the message is recorded on the drum, a special coded signal is recorded to indicate the end of the message in order to facilitate the end of message identification on readout.

Before the receipt of signals relating to a new message, a special enabling pulse is applied to lead 120 and, if the free track number store 400 has recorded therein the identity of a free track, AND gate 408 will be enabled to pass signals indicative of the identity of the free track through AND gate 408 and OR gate 407 to the track number store 420. At the same time, signals will be passed through these gates to the frame number store 400 to set it to the required setting so that the frame comparator 460 will cause the successive frames of the new track to be enabled to read the successive bits from the information bit input lead 110. If the free track number store 400 does not have the identity of a free track registered therein, the interrogating equipment will function as described above to register the identity of the first available free track in the free track number store 400 within one revolution of the drum 100. When the identity of the free track is transferred from the free track number store 400 to the track number store 420, the free track number store 400 is prepared to accept the registration of the identity of another free track in the manner previously described.

The recorded message may be read out one or more times by associated readout equipment (not shown) and when the retention of the message is no longer required the message and the busy mark will be erased from the track, or tracks, that were used.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a data handling system, a closed loop recording medium having a plurality of tracks, a signal source, individual transducing means associated with each track and coupled to said source for recording signals indicative of those received from said source on selected tracks of said medium, drive means for producing relative motion between said medium and said transducing means so that in one cycle each portion of the surface of each track moves past its individual transducing means only once, each of said tracks having recorded thereon in a predetermined portion thereof first or second signals indicative of first or second conditions, respectively, of their respective tracks, individual readout transducing means associated with each track for reading the recorded signals from their respective associated tracks, and common interrogating means coupled to said readout means for enabling said readout means to read out said first and second signals from all of said tracks in the time of one of said cycles said common interrogating means including means for enabling only the one of said readout means having the predetermined portion of its track moving past its readout means to readout the first or second signal recorded therein, whereby each of said readout means is sequentially enabled only once per cycle.

2. The combination as set forth in claim 1 and including counting means coupled to said interrogating means, and advancing means for advancing said counter so that said counter is set to an individual and unique setting each time one of said predetermined portions is moving past its associated readout means, whereby the setting of said counter is indicative of the identity of a track.

3. The combination as set forth in claim 2 and including register means coupled to said interrogating means for registering signals indicative of the setting of said counter when one of said readout means reads said first signal from the predetermined portion of its associated track, whereby a signal indicative of the identity of the track having said first condition is recorded in said register means.

4. In a data handling system, a closed loop recording medium having a plurality of information recording tracks and a control track with each of said tracks subdivided into the same given number of frames, individual transducing means coupled to each of said tracks for recording signals on and reading signals off their respective tracks, drive means for producing relative motion between said transducing means and said medium so that in one cycle each portion of each track moves past its individual transducing means only once, a counter coupled to the transducing means associated with said control track for counting the individual frames of said control track as they advance past said last named transducing means, resetting means for resetting said counter to a predetermined setting at the same predetermined point during each cycle, each of said information recording tracks having a first or second distinctive recording recorded in a predetermined frame of their respective tracks indicative of first or second conditions, respectively, of the individual recording tracks, said predetermined frames so selected and arranged relative to each other and their respective transducing means so that not more than one of said predetermined frames is under its associated transducing means for each setting of said counter, and first register means coupled to said counter for registering signals indicative of the setting of said counter when one of said transducing means reads said first recording from one of said information tracks, whereby the signals registered in said register are indicative of the identity of said one of said tracks.

5. The combination as set forth in claim 4 wherein said first register means includes means for inhibiting any new registration therein when said first register already has signals registered therein.

6. The combination as set forth in claim 5 and including a second register, and control means coupled to said first and second registers for transferring signals from said first to said second register.

7. The combination as set forth in claim 6 and including a source of information signals, and means including said second register for recording signals indicative of the successive signals received from said source in the successive frames of said one of said tracks.

8. In a data handling system incorporating a recording medium subdivided into a plurality of closed loop tracks including at least two information recording tracks and at least one control track and with all of said tracks divided into the same given number of frames, individual transducing means for recording signals on and reading signals off each of said information recording tracks,, a single fiducial recording on one control track, a frame indicating signal recorded at the start of each frame on one control track, drive means for providing relative motion between said medium and said transducing means, a counter for detecting and counting each of said frame indicating recordings, setting means included in said counter for setting said counter to a predetermined count in response to each detection of said fiducial recording, the combination therewith of first or second indicating signals recorded in a different predetermined one of said given frames of each of said information tracks, a first register, and first control means coupled to said transducing means and said first register for causing signals indicative of the setting then in said counter to be transferred to said first register in response to the reading of the first one of said first indicating signals off one of said tracks, whereby signals indicative of the identity of said one of said tracks are registered in said first register.

9. The combination as set forth in claim 8 and including a signal source for providing intelligence bit by bit, and directing means coupled between said source and said transducing means for directing signals from said source to said transducing means.

10. The combination as set forth in claim 9 and including second control means coupled to said directing means for controlling said directing means so that the signals from said source are directed to the one of said transducing means associated with the track from which the first one of said first indicating signals was read.

11. The combination as set forth in claim 10 wherein said directing means includes means for directing the successive bits from said source to successive frames of said one of said tracks.

12. The combination as set forth in claim 11 and including transfer means coupled between said first register and said second control means for transferring signals indicative of the identity of said one of said tracks from said first register to said second control means in response to a predetermined signal from said source.

13. The combination as set forth in claim 12 wherein said first control means causes signals indicative of the setting then in said counter to be transferred to said first register in response to the reading of the next one of said first indicating signals off another of said tracks after the signals indicative of the identity of said one track have been transferred to said second control means, whereby signals indicative of the identity of said other one of said tracks are registered in said first register.

14. The combination as set forth in claim 13 wherein each of said frames is divided into a specific number of time slots, and wherein said first or second indicating signals are recorded in each time slot of each predetermined frame, and wherein said directing means includes means for directing the successive bits which pertain to a given message to a given time slot in successive frames of said one of said tracks.

15. The combination as set forth in claim 14 wherein the signals indicative of the identity of one of said tracks includes signals indicative of the identity of a particular time slot in each of the frames of said one of said tracks.

16. The combination as set forth in claim 15 wherein the successive bits of a given message from said source are separated by a number of bits equal to one less than said specific number.

17. The combination as set forth in claim 16 wherein one control track has recorded thereon a time slot indicating signal at the start of each time slot position for providing timing and synchronizing signals.

References Cited

UNITED STATES PATENTS 3,146,429 8/1964 Laurer et al. -------- 340—174.1

BERNARD KONICK, *Primary Examiner.*

A. I. NEUSTADT, *Assistant Examiner.*